US011068307B2

(12) United States Patent
Kancharla et al.

(10) Patent No.: US 11,068,307 B2
(45) Date of Patent: *Jul. 20, 2021

(54) COMPUTING NODE JOB ASSIGNMENT USING MULTIPLE SCHEDULERS

(71) Applicant: Capital One Services, LLC, McLean, VA (US)

(72) Inventors: Gopi Kancharla, Frisco, TX (US); Sanjiv Yajnik, Dallas, TX (US); Raman Bajaj, Frisco, TX (US); James Land, The Colony, TX (US); Susmitha Gangarapu, McKinney, TX (US); Praveen Tandra, Allen, TX (US); Parvesh Kumar, Plano, TX (US); Janardhan Prabhakara, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/580,459

(22) Filed: Sep. 24, 2019

(65) Prior Publication Data

US 2020/0151006 A1   May 14, 2020

Related U.S. Application Data

(63) Continuation of application No. 16/406,614, filed on May 8, 2019, now Pat. No. 10,474,497.

(Continued)

(51) Int. Cl.
*G06F 9/46* (2006.01)
*G06F 9/48* (2006.01)
*G06F 9/54* (2006.01)

(52) U.S. Cl.
CPC ............ *G06F 9/4881* (2013.01); *G06F 9/546* (2013.01)

(58) Field of Classification Search
CPC .............................. G06F 9/4881; G06F 9/546
See application file for complete search history.

(56) References Cited

U.S. PATENT DOCUMENTS

| 9,584,361 B2 | 2/2017 | Anderson et al. |
| 2014/0006534 A1* | 1/2014 | Jain ........................ G06F 9/5027 709/208 |
| 2016/0323161 A1 | 11/2016 | Cuervo et al. |

OTHER PUBLICATIONS

Co-pending U.S. Appl. No. 16/406,614, filed May 8, 2019.
Rasley J., et al., "Efficient Queue Management for Cluster Scheduling," ACM, 2016, 15 pages.

* cited by examiner

*Primary Examiner* — Diem K Cao
(74) *Attorney, Agent, or Firm* — Harrity & Harrity, LLP

(57) ABSTRACT

A set of computing nodes may receive a corresponding set of heartbeat messages that originated at the set of computing nodes. The set of heartbeat messages may relate to selecting, among the set of computing nodes, a leader computing node to process a set of jobs. State information included in the heartbeat messages may be provided to a leader election algorithm that outputs information indicating one or more computing nodes that are most qualified to process the set of jobs based on processing capabilities of the computing nodes and processing constraints associated with the set of jobs. The computing node may select itself as the leader computing node to process the set of jobs based on determining, from the information output by the leader election algorithm, that the computing node is most qualified to process the set of jobs and no other computing nodes are processing the set of jobs.

20 Claims, 7 Drawing Sheets

Related U.S. Application Data

(60) Provisional application No. 62/767,182, filed on Nov. 14, 2018.

COMPUTING NODE JOB ASSIGNMENT USING MULTIPLE SCHEDULERS

RELATED APPLICATIONS

This application is a continuation of U.S. patent application Ser. No. 16/406,614, filed May 8, 2019, which claims priority under 35 U.S.C. § 119 to U.S. Provisional Patent Application No. 62/767,182, filed on Nov. 14, 2018, the contents of which are incorporated by reference herein in their entirety.

BACKGROUND

A micro-service architecture is a variant of the service-oriented architecture that structures an application as a collection of related services. A micro-service architecture may utilize a modular structure for easier development and/or testing. Services in a micro-service architecture may communicate with one another to fulfill a goal and/or to produce an output from a system.

SUMMARY

According to some implementations, a method may include receiving, by a computing node included in a set of computing nodes, a corresponding set of heartbeat messages that originated at the set of computing nodes, wherein the set of heartbeat messages is related to selecting, among the set of computing nodes, a leader computing node to process a set of jobs associated with the set of computing nodes, and wherein the set of heartbeat messages indicates, for corresponding computing nodes of the set of computing nodes, state information related to processing capabilities of the corresponding computing nodes; providing, by the computing node, the state information included in each of the set of heartbeat messages to a leader election algorithm, wherein the leader election algorithm outputs information indicating one or more computing nodes in the set of computing nodes that are most qualified to process the set of jobs based on the processing capabilities of the corresponding computing nodes and one or more processing constraints associated with the set of jobs; determining, by the computing node and based on the information output by the leader election algorithm, that the computing node is the most qualified to process the set of jobs as compared to other computing nodes included in the set of computing nodes; determining, by the computing node and based on the set of heartbeat messages, that the set of jobs is not being processed by any other computing node included in the set of computing nodes; and selecting, by the computing node, the computing node as the leader computing node to process the set of jobs based on determining that the computing node is the most qualified to process the set of jobs and that the set of jobs is not being processed by any other computing node included in the set of computing nodes.

According to some implementations, a computing node may include one or more memories; and one or more processors, communicatively coupled to the one or more memories, configured to: receive, from a set of computing nodes including the computing node, a corresponding set of heartbeat messages, wherein the set of heartbeat messages is related to selecting, among the set of computing nodes, a leader computing node to process one or more jobs for the set of computing nodes, and wherein the set of heartbeat messages indicates, for corresponding computing nodes of the set of computing nodes, state information related to processing capabilities of the corresponding computing nodes; determine, based on the set of heartbeat messages, a set of scores representing how qualified each computing node is to process the one or more jobs based on the processing capabilities of the corresponding computing nodes and one or more processing constraints associated with the one or more jobs; determine, based on the set of scores, whether the computing node is to be selected as the leader computing node based on: whether the computing node is most qualified to process the one or more jobs as compared to other computing nodes included in the set of computing nodes, and whether the one or more jobs are being processed by any other computing node included in the set of computing nodes; and selectively process the one or more jobs for the set of computing nodes based on whether the computing node is to be selected as the leader computing node.

According to some implementations, a non-transitory computer-readable medium may store one or more instructions. The one or more instructions, when executed by one or more processors of a computing node, may cause the one or more processors to: receive, from a set of computing nodes including the computing node, a corresponding set of heartbeat messages related to selecting, among the set of computing nodes, a leader computing node to process one or more jobs for the set of computing nodes, and wherein the set of heartbeat message indicates, for each corresponding computing node of the set of computing nodes: a unique identifier that distinguishes the corresponding computing node from all other computing nodes included in the set of computing nodes, and state information related to processing capabilities of the corresponding computing node; determine, based on the set of heartbeat messages, a set of scores representing how qualified each computing node is to process the one or more jobs based on the processing capabilities of the corresponding computing node and one or more processing constraints associated with the one or more jobs; determine, based on the set of scores, whether the computing node is to be selected as the leader computing node based on whether a unique identifier associated with the computing node corresponds to the unique identifier in one of the set of the heartbeat messages associated with a highest score in the set of scores; and selectively process the one or more jobs based on determining whether the computing node is to be selected as the leader computing node.

DETAILED DESCRIPTION

Figure 1A:
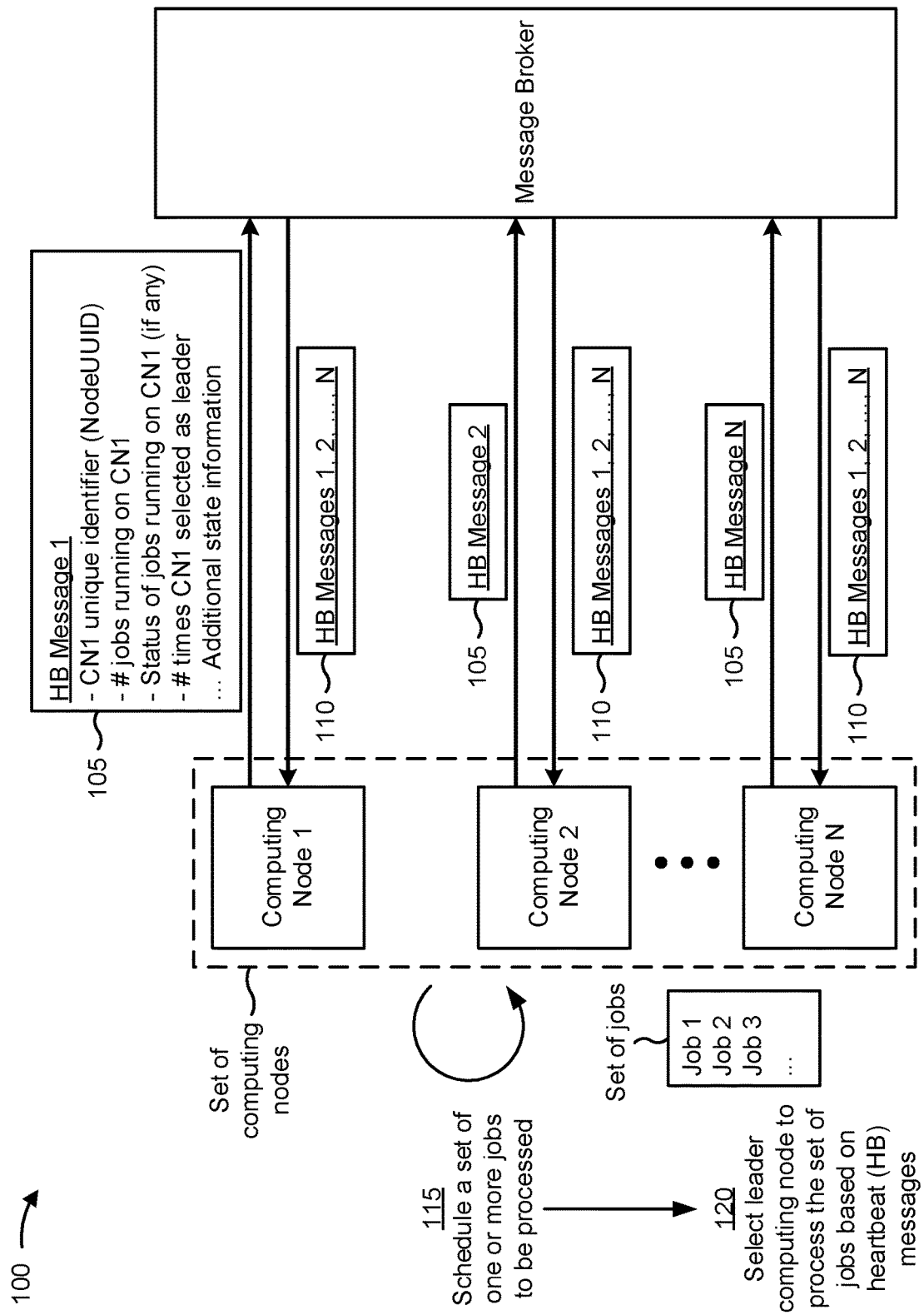
FIGS. 1A-1B are diagrams of one or more example implementations described herein.

The following detailed description of example implementations refers to the accompanying drawings. The same reference numbers in different drawings may identify the same or similar elements.

Various micro-services may be coordinated within an application to generate an output. For example, various micro-services may be associated with an application for processing a loan request, and the micro-services may be coordinated to determine whether the loan request is accepted, is rejected, is escalated to an individual for further review, and/or the like. In a micro-services architecture, a set of computing nodes (e.g., containerized application instances, server devices, user devices, and/or the like, which may be distributed across different geographic regions) may process jobs related to the micro-services to generate output for the micro-services. If multiple computing nodes perform the same job to generate the same output, this wastes significant computing resources of the computing nodes, wastes network resources (e.g., bandwidth) of a network that is used to provide the output to a destination device, delays processing of other jobs, wastes computing and/or network resources of the destination device that receives the output from multiple computing nodes, and/or the like.

To ensure that multiple computing nodes do not process the same job, and to make sure that all jobs are processed, some implementations described herein may select, among multiple computing nodes in a set of computing nodes, a single computing node to act as a leader (e.g., a leader computing node) to process a given set of jobs that are scheduled to be processed during a particular scheduling instance. In some implementations, there may be multiple schedulers running in the set of computing nodes (e.g., one or more scheduler instances per computing node), and the schedulers may schedule new jobs and/or failed jobs (e.g., jobs that were previously scheduled but that experienced a failure due to, for example, a failure in a communication link of the micro-services architecture, a failure in processing a job, and/or the like) by storing information related to the scheduled jobs in one or more data structures that are shared among the set of computing nodes. The multiple schedulers may be configured to check the one or more shared data structures to determine whether there are one or more sets of jobs to be processed during a particular (e.g., current or future) scheduling instance, and the multiple schedulers may each execute a leader election algorithm to determine whether to proceed with processing a given set of jobs. Furthermore, some implementations described herein may ensure that only a single computing node is selected to process a given set of jobs (e.g., one or more jobs that are grouped together based on a job identifier, a scheduling instance, and/or the like), thereby preventing multiple computing nodes from processing the same job(s).

Furthermore, some implementations described herein may use a decentralized scheduling architecture, where scheduling is performed by multiple computing nodes, rather than using one or a limited number of computing nodes for scheduling. In this way, scheduling may continue to be performed even if a computing node failure occurs (e.g., if communications with a computing node fail, if the computing node fails, and/or the like). In this way, by using multiple computing nodes to perform scheduling operations, multiple jobs can be run during a particular scheduling instance, with jobs grouped together based on one or more processing constraints (e.g., a job identifier, a scheduled time when the jobs are to be processed, and/or the like). Furthermore, some implementations described herein may distribute responsibilities for processing jobs across the set of computing nodes (e.g., evenly, randomly, and/or the like) using a leader election algorithm that outputs information indicating one or more computing nodes in the set of computing nodes that are most qualified to process a particular set of jobs based on state information related to processing capabilities of the corresponding computing nodes and the processing constraints associated with the set of jobs. This may prevent individual computing nodes from becoming overloaded with processing jobs (e.g., which may be resource-intensive), prevent underutilization of resources associated with the individual computing nodes, improve functioning of individual computing nodes by preventing such overloading and/or underutilization of resources, and/or the like.

In some implementations, the technique(s) used to select the leader computing node to process a given set of jobs may be standardized and/or synchronized across the set of computing nodes, ensuring that only a single computing node is selected as the leader with respect to the given set of jobs, thereby ensuring that multiple computing nodes do not process the same job and thereby conserving computing resources (e.g., memory resources, processing resources, power, and/or the like). Furthermore, these techniques facilitate quick and efficient assignment of jobs among computing nodes, thereby improving functioning of the computing nodes by using less network throughput. In some implementations, nodes can be added to and/or removed from the set of computing nodes according to an automatic plug-and-play mechanism, whereby nodes that are added to the set of computing nodes may be configured to automatically perform the standardized and/or synchronized technique(s) used to select the leader computing node (e.g., transmitting heartbeat messages, analyzing heartbeat messages using the leader election algorithm, and/or the like) without human intervention.

Furthermore, when the computing nodes are distributed across multiple geographic regions, some techniques described herein may be used to communicate with the computing nodes in different geographic regions to ensure that no job is duplicated across the geographic regions (e.g., on computing nodes in different geographic regions). For example, a message broker as described in further detail elsewhere herein may permit a multi-cluster deployment of computing nodes (e.g., in disparate geographic regions) while ensuring that jobs are not duplicated across those regions.

Figure 1B:
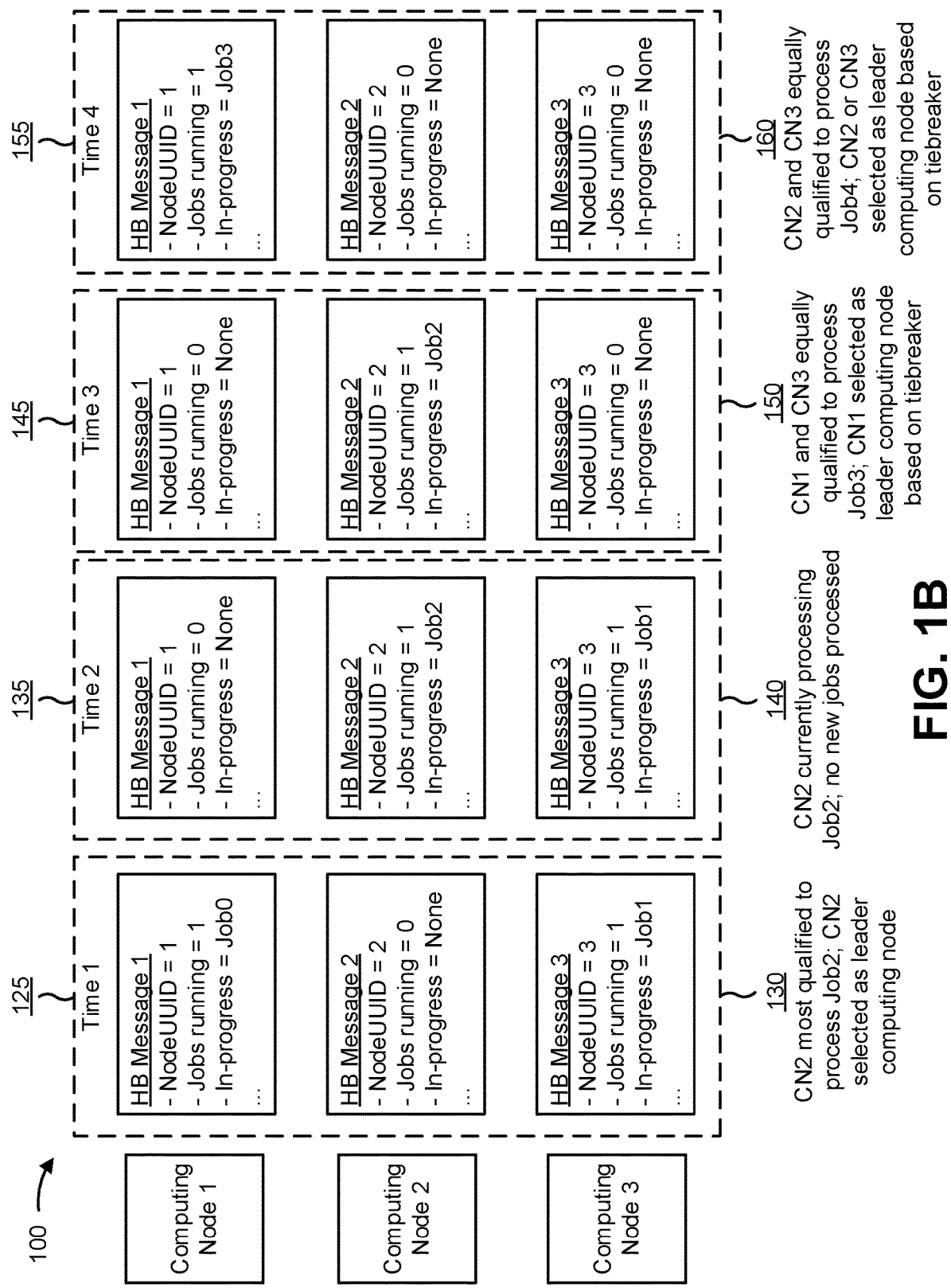

FIGS. 1A-1B are diagrams of one or more example implementations 100 described herein. As shown in FIG. 1A, example implementation 100 may include a message broker (e.g., a publish-subscribe message queue or event bus such as Kafka® and/or a message broker that interfaces with Kafka®) and a set of computing nodes 1 though N (e.g., where N is greater than or equal to 2), one of which may be selected as a leader (e.g., sometimes referred to herein as a leader computing node) to process a particular set of one or more jobs. In some implementations, the set of computing nodes may be grouped into a computing cluster (e.g., a set of computing nodes associated with the same application, associated with related micro-services, and/or the like). In some implementations, computing nodes can be dynamically added to and/or removed from the set of computing nodes according to an automatic plug-and-play mechanism, and each computing node added to or otherwise included in the set of computing nodes may automatically perform a standardized and/or synchronized technique to self-determine a leader computing node to process a particular set of jobs without human intervention.

In some implementations, multiple schedulers may be implemented on the computing nodes (e.g., each computing node or a subset of the computing nodes may run a scheduler that can schedule a set of jobs to be processed by one of the computing nodes during a particular scheduling instance). In some implementations, the message broker may be implemented as a separate application, device, and/or the like. Alternatively, the message broker may be implemented on the computing nodes. In some implementations, the computing nodes may be configured to perform various jobs related to a set of micro-services. For example, a job may include one or more computing instructions (e.g., code and/or the like), and may be performed and/or processed by executing those computing instructions.

As shown in FIG. 1A, and by reference numbers 105, the computing nodes may transmit heartbeat (HB) messages to the message broker. For example, the computing nodes may be subscribed to a message stream of the message broker, associated with the heartbeat messages, and may each publish respective heartbeat messages to the message stream. All of the computing nodes may receive the respective heartbeat messages based on being subscribed to the message stream. In some implementations, the respective heartbeat messages may indicate state information related to processing capabilities of the corresponding computing nodes, which may provide sufficient context to enable each computing node to independently self-determine whether to process a particular set of jobs or refrain from processing the particular set of jobs. For example, each computing node may execute a leader election algorithm that outputs information indicating one or more computing nodes that are most qualified to process the set of jobs based on the state information included in each of the set of heartbeat messages and processing constraints associated with the set of jobs. Accordingly, the leader computing node may be selected from among the one or more computing nodes that are most qualified to process the set of jobs. Notably, while each computing node may independently execute the leader election algorithm to self-determine whether to process a particular set of jobs or refrain from processing the particular set of jobs, each computing node may input the same information to the leader election algorithm (e.g., information in the respective heartbeat messages) such that each computing node independently arrives at the same decision regarding the node to be selected as the leader computing node with respect to the particular set of jobs.

In some implementations, a heartbeat message may include information relating to selecting a leader computing node to process a particular set of jobs. For example, a heartbeat message may include information that identifies the computing node from which the heartbeat message originated, such as by including a computing node identifier, a unique identifier (e.g., a universal unique identifier (UUID), sometimes referred to as Node UUID or NodeUUID for a computing node) that distinguishes a computing node from all other computing nodes in the set of computing nodes, a network address, and/or the like. Additionally, or alternatively, a heartbeat message may include state information related to processing capabilities of a computing node from which the heartbeat message originated. For example, in some implementations, the state information related to the processing capabilities of the computing node may include information that identifies a quantity of jobs executing on the computing node, one or more identifiers associated with the job(s) executing on the computing node (e.g., an identifier associated with an individual job, a group of related jobs, and/or the like), a status of any jobs that are executing on the computing node (e.g., whether the job(s) are in-progress, completed, queued, pending, aborted, failed, expired, and/or the like), a number of times that the computing node has been selected as the leader computing node, and/or the like. As described in more detail elsewhere herein, this information may be used to select a leader computing node to process a particular set of jobs such that a particular computing node is not overloaded with processing jobs, multiple computing nodes do not perform duplicate work processing the same job(s), a load associated with processing jobs is distributed among available computing nodes (e.g., evenly, randomly, and/or the like), and/or the like.

Additionally, or alternatively, a heartbeat message may include other state information related to the processing capabilities of a computing node, information relating to processing of a job by the computing node, and/or the like. For example, a heartbeat message, originated by a computing node, may include information that indicates an amount of computing resources (e.g., memory resources, processor resources, network resources, and/or the like) of the computing node being consumed by processing a job, a total processing capacity associated with the computing node (e.g., a quantity of jobs that the computing node can process at a given time), a processing throughput associated with the computing node (e.g., an amount of time in which the computing node can process a job), a historical job load (e.g., a total quantity of jobs that have been processed by the computing node, statistics related to job loads at certain times or over certain periods, and/or the like), a geographic location of the computing node (e.g., to assign jobs to computing nodes located closer to intended destination devices), an age of the computing node, a configuration of the computing node (e.g., an identifier of an application hosted on the computing node), a version of software installed on the computing node (e.g., a version of a scheduler, an operating system, and/or the like), scheduled downtime for the computing node (e.g., for maintenance, updates, and/or the like), historical failures for the computing node (e.g., rates at which jobs processed by the computing node fail to complete), and/or the like.

In some implementations, the computing nodes may be configured with respective clocks that are synchronized to the same time (or within a threshold amount of time of each other). In some implementations, based on a time indicated by the respective clocks, the computing nodes may transmit the heartbeat messages according to a periodicity, at a set of pre-determined times, and/or the like. For example, the computing nodes may publish respective heartbeat messages to a message stream associated with the message broker every 20 seconds, every 30 seconds, every minute, ten times per hour, and/or the like.

As shown in FIG. 1A, and by reference number 110, each computing node, included in the set of computing nodes, may receive heartbeat messages from every computing node included in the set of computing nodes. For example, the message broker may receive heartbeat messages from each computing node, and may transmit all of those heartbeat messages to all of the computing nodes. Thus, a specific computing node may receive the heartbeat message transmitted by that computing node, as well as the heartbeat messages transmitted by every other computing node included in the set of computing nodes.

In some implementations, two or more of the computing nodes may be located in different geographic regions (e.g., in different clusters of computing nodes), and may transmit heartbeat messages to a corresponding local message broker (e.g., associated with a cluster) at different periodicities and/or times (e.g., different intervals between transmissions, different times of transmission, and/or the like). The message broker (e.g., a global message broker that interfaces with all clusters) may receive heartbeat messages from the computing nodes in the different geographic regions (e.g., via local message brokers), and may transmit those heartbeat messages to all computing nodes in all geographic regions with a specific periodicity, which may be distinct form the periodicities used locally. In this way, the distribution of heartbeat messages and/or job assignments is not dependent upon local message periodicities, and can ensure that no job is duplicated on computing nodes in different geographic regions.

As shown in FIG. 1A, and by reference number 115, one or more computing nodes in the set of computing nodes may schedule one or more jobs for the computing nodes. Such scheduling may include storing, in one or more data structures that are shared among the set of computing nodes, information related to one or more processing constraints for a set of one or more jobs to be processed. For example, the one or more processing constraints for a particular set of jobs may include a job identifier (e.g., a UUID associated with the set of jobs and/or individual jobs within the set of jobs), a timing constraint (e.g., a day when the set of jobs is to be processed, a time when the set of jobs is to be processed, and/or the like), information related to the computing node that scheduled the set of jobs (e.g., a UUID of the computing node, geographic location of the computing node, and/or the like), one or more dependencies for the set of jobs (e.g., upstream jobs that produce an output to be used by the current set of jobs, downstream jobs that consume an output to be produced by the current set of jobs, and/or the like), one or more resource constraints (e.g., processor resources, memory resources, network resources, and/or the like needed to process the current set of jobs), a quality of service (QoS) constraint (e.g., low-latency, high-throughput, and/or the like), and/or the like.

As shown in FIG. 1A, and by reference number 120, each computing node may analyze the set of received heartbeat messages using a leader election algorithm to determine, with respect to a particular set of jobs, whether that computing node is to be selected as the leader to process the particular set of jobs. In some implementations, a computing node may determine whether to select itself as the leader to process the particular set of jobs based on the information included in the heartbeat messages (e.g., the state information related to the processing capabilities of the various computing nodes), the information stored in the one or more data structures that are shared among the set of computing nodes (e.g., the information related to the one or more processing constraints for a set of jobs to be processed), and/or the like. Each computing node in the set of computing nodes may make this determination for itself (e.g., whether to select itself as the leader) using the same determination process as the other computing nodes, such that only a single computing node is selected as the leader to process a particular set of jobs (e.g., corresponding to a set of heartbeat messages received together). As described in more detail below in connection with FIG. 1B, the leader election algorithm may base this determination on one or more factors used to determine one or more of the computing nodes that are most qualified to process a particular set of jobs, a hash function to evenly and/or randomly distribute jobs among the computing nodes (e.g., when multiple computing nodes are tied for being the most qualified to process a particular set of jobs), and/or the like.

In general, the leader election algorithm executed at each computing node may output, based on the set of heartbeat messages, a set of scores representing how qualified each computing node is to process the particular set of jobs based on the processing capabilities of the corresponding computing nodes and the processing constraints associated with the set of jobs. For example, in some implementations, the set of scores may be based on the number of jobs that each computing node has processed and/or is currently processing, where the most qualified computing node may be one that is processing a fewest number of jobs, as compared to the other computing nodes. Additionally, or alternatively, the set of scores may be based on various factors that are considered in combination with one another. For example, in some implementations, the set of scores may be based on the number of jobs that have been processed and/or are currently being processed by the various computing nodes, processing capabilities of the computing nodes (e.g., how many jobs each computing node can process at once), throughput of the computing nodes (e.g., how quickly the computing nodes can process jobs), an anticipated job load (e.g., knowing that there are typically X jobs to be processed on weekdays during work hours, and there are typically Y jobs to be processed on weekends, where Y is less than X), a historical job load, geographic locations of the computing nodes that scheduled the jobs, geographic locations of the computing nodes, ages of the computing nodes, configurations of the computing nodes, scheduled downtime for the computing nodes, historical failures of the computing nodes, predicted failures of the computing nodes, dependencies among jobs and/or sets of jobs, timing constraints or performance constraints for certain jobs, and/or the like.

In some implementations, the leader election algorithm may use artificial intelligence techniques, machine learning techniques, deep learning techniques, and/or the like to determine, among the set of computing nodes, one or more computing nodes that are most qualified to process a particular set of jobs. For example, the leader election algorithm may use a machine learning model to generate the set of scores representing how qualified each computing node is to process the particular set of jobs. The machine learning model may be trained based on one or more parameters that relate to computing node processing capabilities, job processing constraints, and/or the like, as described elsewhere herein. Accordingly, the trained machine learning model can be provided to all of the computing nodes (e.g., on a scheduled basis, an on-demand basis, a triggered basis, a periodic basis, and/or the like) such that all of the computing nodes operate on the same machine learning model when determining the one or more computing nodes most qualified to process a given set of jobs. In this way, providing the trained machine learning model to all of the computing nodes may standardize and/or synchronize the technique(s) that the leader election algorithm uses to determine the most qualified computing node(s) with respect to the given set of jobs, which may ensure that only a single computing node is selected as the leader with respect to the given set of jobs, ensure that multiple computing nodes do not process the same job, conserve computing resources, and/or the like.

In some implementations, when the leader election algorithm indicates one particular computing node in the set of computing nodes that is most qualified to process a particular set of jobs (e.g., because the particular computing node is processing a fewest number of jobs among all of the computing nodes, the particular computing node has a best score based on multiple factors that are evaluated together, and/or the like), the particular computing node may be selected as the leader to process the particular set of jobs.

Additionally, or alternatively, the leader election algorithm may indicate that multiple computing nodes are tied for being the most qualified to process the particular set of jobs, in which case a tiebreaker mechanism may be used to select one of the multiple computing nodes to be the leader.

For example, in some implementations, the tiebreaker may include calculating a hash based on one or more unique identifiers associated with each respective computing node and a time associated with the set of heartbeat messages being analyzed for the current scheduling instance. Accordingly, the tie may be broken by selecting, among the multiple computing nodes that are tied for being the most qualified to process the particular set of jobs, one computing node for which the hash satisfies a condition (e.g., the hash that has a smallest value or a largest value among the hashes associated with the multiple computing nodes that are tied for being the most qualified). In this way, the hash may provide a unique output to associate with a given input string, which includes the one or more unique identifiers associated with each respective computing node to ensure that each hash is different and the time associated with the set of heartbeat messages to randomize the hash computed for each computing node across different scheduling instances.

Additionally, or alternatively, if the set of heartbeat messages indicate that a computing node is already processing the particular set of jobs, then the computing nodes may refrain from selecting a different computing node as the leader to process the particular set of jobs unless a subsequent set of heartbeat messages indicate that the computing node failed to successfully finish processing the particular set of jobs (at which time a leader may be selected to process the set of jobs). Additional details related to the leader election algorithm are provided below in connection with FIG. 1B.

In some implementations, the computing nodes may transmit the heartbeat messages according to a periodicity that indicates multiple instances of time at which the computing nodes are to transmit the heartbeat messages. In some implementations, each instance of time corresponds to a scheduling instance in which the computing nodes are to perform the determination and/or selection process described herein to determine whether any computing nodes are to be selected as the leader to process a particular set of jobs and/or to select a computing node as the leader to process a particular set of jobs. A computing node that has been selected as the leader based on analyzing a first set of heartbeat messages may update the information to be transmitted in a next heartbeat message to be transmitted by that computing node. For example, when the next heartbeat message is generated, the computing node may update the number of jobs executing on the computing node (e.g., by incrementing a counter value), indicate an identifier and a status associated with one or more jobs or sets of jobs executing on the computing node, update other state information related to the processing capabilities of the computing node, update the number of times that the computing node has been selected as the leader (e.g., by incrementing a counter value), and/or the like. This updated information may be included in the next heartbeat message and used to select the leader to process another set of jobs for a subsequent scheduling instance that corresponds to a second set of heartbeat messages transmitted by the computing nodes.

A specific example of how the leader election algorithm may operate is described below in connection with FIG. 1B. In the example provided below, the leader election algorithm may indicate a particular computing node to be selected as the leader computing node to process a set of jobs scheduled to be executed during a particular scheduling instance (e.g., a next time slice, a next job execution interval, and/or the like). In the following description, the leader election algorithm is explained in a context of an example use case in which the most qualified computing node is selected from one or more computing nodes that are processing a fewest number of jobs (e.g., such that new jobs to be processed are assigned to computing nodes that are executing fewer jobs in order to avoid overloading and/or underutilizing various computing nodes, evenly distribute a job processing load among computing nodes, and/or the like). However, this example use case is for simplicity and illustration purposes only, as some implementations may configure the leader election algorithm to evaluate various factors based on the processing capabilities of the various computing nodes (e.g., as indicated in the heartbeat messages), processing constraints associated with the set of jobs (e.g., as indicated by a source computing node that scheduled the set of jobs), and/or the like, as mentioned elsewhere herein.

As shown in FIG. 1B, the set of computing nodes may include three computing nodes as an example. As shown in FIG. 1B, and by reference number 125, the three computing nodes may each transmit a heartbeat message to the message broker at a first time (shown as Time 1), and may receive all heartbeat messages from the message broker. At the first time, a first heartbeat message (shown as HB Message 1) from the first computing node (shown as Computing Node 1) indicates a universal unique identifier (Node UUID) of 1 for the first computing node, indicates that the first computing node is currently running one job, and indicates an identifier (Job0) for the job currently running on the first computing node. A second heartbeat message (shown as HB Message 2) from the second computing node (shown as Computing Node 2) indicates a Node UUID of 2 for the second computing node, indicates that the second computing node has zero jobs running, and indicates that there are no in-progress jobs running on the second computing node. A third heartbeat message (shown as HB Message 3) from the third computing node (shown as Computing Node 3) indicates a Node UUID of 3 for the third computing node, indicates that the third computing node is currently running one job, and indicates an identifier (Job1) for the job currently running on the third computing node.

As shown in FIG. 1B, and by reference number 130, based on these heartbeat messages, the second computing node may select itself as the leader to process a current set of jobs, which is associated with a particular identifier (Job2) used to group the set of jobs. For example, to assist with even distribution of a job processing load across the set of computing nodes, the computing node that is running the fewest number of jobs as of a scheduling instance (e.g., corresponding to Time 1) may be selected as the leader for the set of jobs scheduled to start processing during that scheduling instance. In some implementations, other conditions and/or factors may be used to determine which computing node is to be selected as the leader.

For example, as mentioned elsewhere herein, state information indicated in the heartbeat messages and/or processing constraints associated with the set of jobs may be used to select the leader computing node. For example, the leader election algorithm may be configured to select a computing node based on a transmission delay of heartbeat messages (e.g., a time between when the heartbeat message was supposed to have been transmitted, according to the periodicity, and when the heartbeat message was actually transmitted), such as to select a computing node with the least delay (e.g., for fastest scheduling). Additionally, or alternatively, the leader election algorithm may be configured to select a computing node based on a version of the computing node (e.g. a version of a container image), a version of software (e.g., the scheduler, scheduling software, and/or the like) executing on the computing nodes (e.g., to select a computing node with the latest version of software), and/or the like. For example, each heartbeat message may include an identifier associated with a version of an application instance (e.g., a version of a container image) associated with the corresponding computing node that generates the heartbeat message. In some implementations, if different versions of the computing node are executing within the set of computing nodes, then only a computing node with the newest version of the application instance may be selected as the leader.

As shown in FIG. 1B, and by reference number 135, the three computing nodes may each transmit a heartbeat message to the message broker at a second time (shown as Time 2), and may receive all heartbeat messages from the message broker. At the second time, a first heartbeat message from the first computing node indicates a Node UUID of 1 for the first computing node, indicates that the first computing node has zero jobs running, and indicates that there are no in-progress jobs running on the first computing node. In this way, the first heartbeat message from the first computing node may indicate that the first computing node has completed processing Job0, which was in-progress at the time when the first computing node transmitted the previous heartbeat message. A second heartbeat message from the second computing node indicates a Node UUID of 2 for the second computing node, indicates that the second computing node is currently running one job, and indicates the identifier (Job2) for the job currently running on the second computing node. In this case, due to the second computing node being selected as the leader to process the set of jobs that was scheduled to start in association with Time 1, the second computing node has incremented a counter value that indicates the number of jobs currently running on the second computing node, and has transmitted an updated number in the heartbeat message associated with Time 2. Furthermore, in this case, a length of time required to process the set of jobs that was assigned to the second computing node is longer than a periodicity associated with the heartbeat messages, so the second computing node indicates, in the second heartbeat message, that the second computing node is still processing the set of jobs. A third heartbeat message from the third computing node at Time 2 indicates the same information as at Time 1 because the third computing node was not selected as the leader at Time 1 and the set of jobs that were in-progress at Time 1 are still in-progress at Time 2.

As shown in FIG. 1B, and by reference number 140, because the second computing node is still executing the set of jobs that was assigned to the second computing node at Time 1 and there are no new jobs scheduled to start processing at Time 2, no other computing node is permitted to be selected as the leader for this scheduling instance. In this case, the second computing node and the third computing node continue to process the in-progress jobs and then indicate an updated status for the in-progress jobs in a next heartbeat message.

As shown in FIG. 1B, and by reference number 145, the three computing nodes may each transmit a heartbeat message to the message broker at a third time (shown as Time 3), and may receive all heartbeat messages from the message broker. At the third time, a first heartbeat message from the first computing node at Time 3 indicates the same information as at Time 2 because no new jobs started processing at the scheduling instance associated with Time 2. Furthermore, a second heartbeat message from the second computing node at Time 3 indicates the same information as at Time 2 because the second computing node has not finished processing the set of jobs that was assigned to the second computing node. A third heartbeat message from the third computing node at Time 3 indicates that there are zero jobs running on the third computing node and there are no in-progress jobs on the third computing node, which indicates that the third computing node may have finished processing Job 1, which was in-progress when the previous heartbeat messages were transmitted at Time 1 and Time 2.

As shown in FIG. 1B, and by reference number 150, based on the heartbeat messages received in association with Time 3, the first computing node and the third computing node may be equally qualified to be the leader computing node (e.g., because the first computing node and the third computing node are tied for running the fewest number of jobs). During this scheduling instance, the second computing node may determine not to select itself as the leader because the second computing node is not running the fewest number of jobs. However, because the first and third computing nodes are tied for being the most qualified to process the set of jobs scheduled to start at Time 3, the first and third computing nodes may evaluate other information to break the tie and determine which computing node is to be selected as the leader. For example, in some implementations, the computing node with an identifier that satisfies a condition may be selected as the scheduler. In example implementation 100, the condition is that the identifier yields a hash that has a smallest value or a largest value as compared to one or more hashes yielded from identifiers of the other computing nodes that are tied for being the most qualified. In particular, the hash may be any suitable one-way function (e.g., SHA-256) that calculates a unique output based on a given input string, which may be used to enforce random distribution when breaking ties to assign jobs to computing nodes.

For example, a hash for the first computing node may be calculated using an input string based on (e.g., concatenating) the unique identifier associated with the first computing node and a time at which the heartbeat messages associated with Time 3 were transmitted. Similarly, a hash for the third computing node may be calculated using an input string based on (e.g., concatenating) the unique identifier associated with the third computing node and the time at which the heartbeat messages associated with Time 3 were transmitted. In the illustrated example, the hash for the first computing node satisfies the condition (e.g., is the smallest or largest value as compared to hashes associated with the other computing nodes that are tied for being the most qualified). Thus, for the scheduling instance corresponding to Time 3, the first computing node is selected to be the leader instead of the third computing node. Notably, the first computing node and the third computing node compute the respective hashes using the same methodology, whereby both the first computing node and the third computing node may independently arrive at the determination that the first computing node is to be selected as the leader computing node. Thus, the first computing node may select itself as the leader and start to process a next set of jobs (e.g., jobs associated with identifier Job3), and the second and third computing nodes may refrain from processing the next set of jobs based on the leader election algorithm indicating that the first computing node is to process the next set of jobs.

As shown in FIG. 1B, and by reference number 155, the three computing nodes may each transmit a heartbeat message to the message broker at a fourth time (shown as Time 4), and may receive all heartbeat messages from the message broker. At the fourth time, a first heartbeat message from the first computing node at Time 4 indicates that there is one job running on the first computing node and further indicates the identifier associated with the in-progress job(s). Furthermore, a second heartbeat message from the second computing node indicates that there are zero jobs running on the second computing node (e.g., the second computing node finished processing Job2) and a third heartbeat message from the third computing node indicates the same information as Time 3.

As shown in FIG. 1B, and by reference number 160, based on the heartbeat messages received in association with Time 4, the second computing node and the third computing node may be tied for being the most qualified to be the leader computing node. During this scheduling instance, the first computing node may determine not to select itself as the leader because the first computing node is running more jobs than the other two computing nodes and is therefore less qualified to be the leader for the current scheduling instance. Accordingly, during this scheduling instance, either the second computing node or the third computing node may be selected as the leader based on the tiebreaker mechanism. For example, a hash for the second computing node may be calculated based on the unique identifier associated with the second computing node and a time at which the heartbeat messages associated with Time 4 were transmitted. Similarly, a hash for the third computing node may be calculated based on the unique identifier associated with the third computing node and the time at which the heartbeat messages associated with Time 4 were transmitted. Depending on the tiebreaking condition configured in the leader election algorithm (e.g., whether to select the computing node associated with the smallest or largest hash value), either the second computing node or the third computing node will be selected as the leader to process a next set of jobs scheduled to start at Time 4.

In some implementations, when executing the leader election algorithm to determine whether a computing node should select itself as the leader to process a set of jobs that are scheduled to start processing, the computing node may determine whether any computing node is executing the set of jobs before determining whether the computing node is the most qualified to process the set of jobs. In this way, the computing node may conserve computing resources that would otherwise be wasted by first determining whether the computing node is the most qualified and then determining that another computing node is currently executing the set of jobs (e.g., resulting in no selection of a different computing node as the leader).

In some implementations, when executing the leader election algorithm to self-determine whether a computing node should select itself as the leader to process a set of jobs that are scheduled to start processing, the computing node may generate a sorted list of unique identifiers included in a set of heartbeat messages received from a corresponding set of computing nodes (e.g., including the computing node generating the list). The list may be sorted according to the score representing how qualified each computing node is to process the set of jobs (e.g., based on number of jobs running on each computing node and/or the like). If there is a tie among multiple computing nodes for being the most qualified to process the set of jobs, then the list may be further sorted according to a tiebreaker mechanism. For example, as described above, the tiebreaker mechanism may be a hash that is calculated for each respective computing node that is tied for being the most qualified to process the set of jobs. For example, the hash may be based on a unique identifier associated with the respective computing node and a time associated with the heartbeat messages evaluated during the current interval (e.g., a time when the heartbeat messages were sent). In this way, by using the unique identifiers associated with the respective computing nodes as an input to a function used to calculate the hash, the tie may be broken because each respective computing node may be associated with a different hash. Furthermore, by using the time associated with the heartbeat messages as an additional input to a function used to calculate the hash, the hash may be randomized based on time, which may prevent the tiebreaker from always choosing the same computing node.

Accordingly, when generating the sorted list of unique identifiers, the leader election algorithm may first sort the list of unique identifiers according to the score representing how qualified each computing node is to process the set of jobs and (if necessary) sort next based on the hash (or other tiebreaker mechanism(s)). In some implementations, the leader election algorithm may compute the hash used for the next sort only when there are multiple computing nodes that are tied for being the most qualified. This may conserve computing resources that would otherwise be wasted calculating a hash or other value to break a tie that may not exist. In some implementations, each computing node may execute the same leader election algorithm based on the same set of inputs (e.g., contents of the heartbeat messages, processing constraints associated with the set of jobs scheduled to start processing, and/or the like), meaning that each computing node may independently generate the same sorted list. Accordingly, each computing node may use the sorted list to self-determine whether to select itself as the leader to process the set of jobs scheduled to start processing. In some implementations, a unique identifier may be included in the list and/or the sorted list only if a computing node, identified by the unique identifier, has a latest version of software (e.g., a scheduler, an application instance, and/or other software) installed. In this case, a version associated with a unique identifier may be compared to all other versions in the heartbeat messages, and may be added to the list only if the version is greater than or equal to all other versions.

In some implementations, a computing node may store information included in a received set of heartbeat messages in memory. In some implementations, the computing node may delete the information after determining whether the computing node is to be selected as the leader based on the information included in the received set of heartbeat messages. This may free up memory to store subsequently received heartbeat messages. In this way, memory resources of the computing nodes may be conserved.

Furthermore, by selecting a computing node as the leader computing node using the techniques described herein, the selection may be limited to a single computing node at a time, thereby preventing the assignment of the same job(s) to multiple computing nodes and reducing the likelihood of missing a job. Furthermore, multiple computing nodes may schedule jobs (e.g., by publishing information associated with a set of jobs to one or more data structures that are shared among all of the computing nodes), which may ensure that scheduling operations continue to be performed even if one or more computing nodes fail. Furthermore, by distributing scheduling responsibilities and job processing responsibilities across the set of computing nodes, individual computing nodes may be less likely to become overloaded with processing jobs (e.g., which may be resource-intensive), may have improved functioning due to preventing such overloading, may have increased availability to process jobs, and/or the like.

As indicated above, FIGS. 1A-1B are provided as one or more examples. Other examples may differ from what is described with regard to FIGS. 1A-1B.

Figure 2:
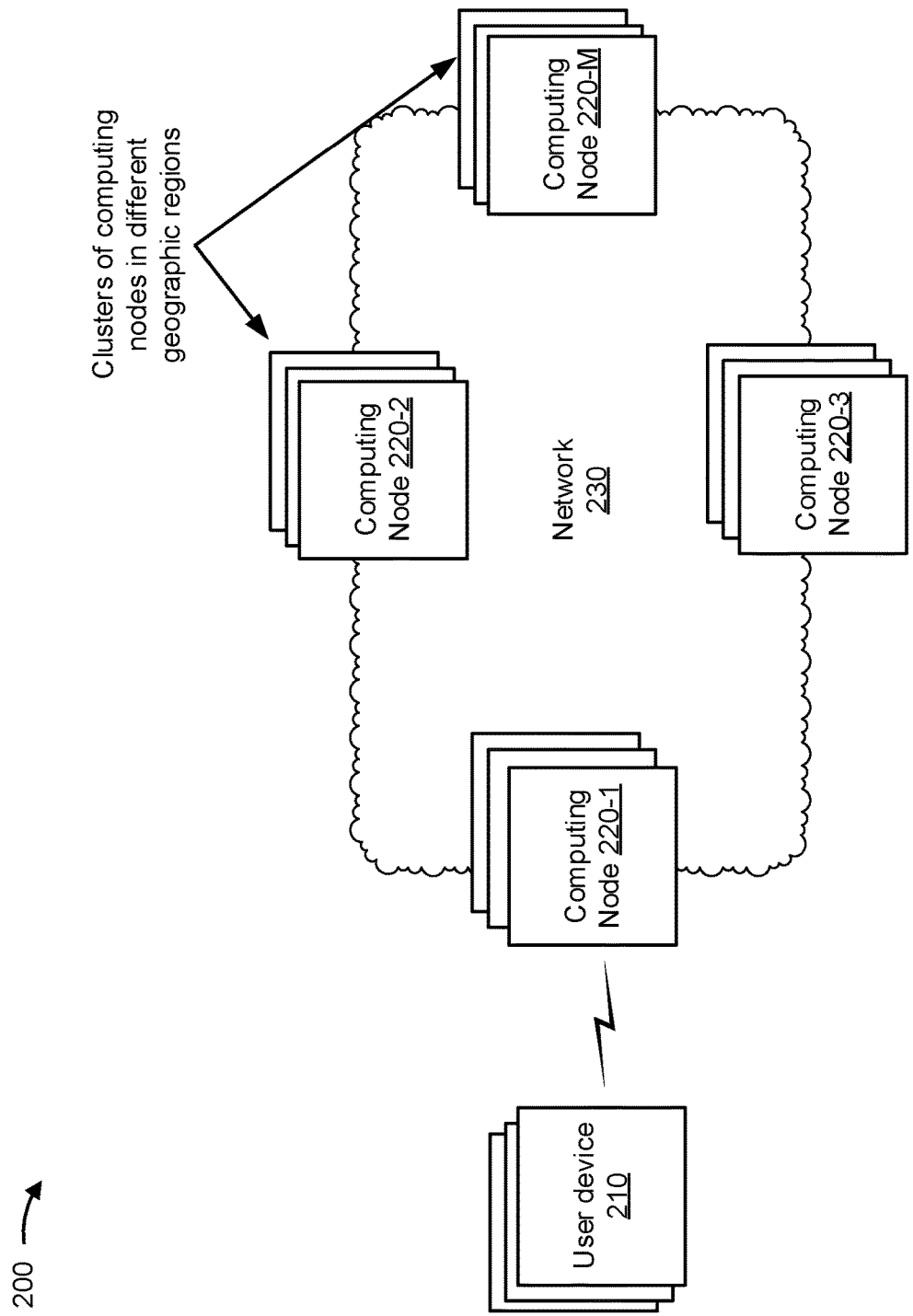
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), computing nodes 220-1 through 220-M (M>2) (referred to collectively as "computing nodes 220" and individually as "computing node 220"), and a network 230. Devices of environment 200 may interconnect via wired connections, wireless connections, or a combination of wired and wireless connections.

User device 210 includes one or more devices capable of receiving, generating, storing, processing, and/or providing information associated with a set of jobs, related to a set of micro-services, that are scheduled for processing by computing nodes 220. For example, user device 210 may include a desktop computer, a mobile phone (e.g., a smart phone, a radiotelephone, and/or the like), a laptop computer, a tablet computer, a handheld computer, a gaming device, a virtual reality device, a wearable communication device (e.g., a smart wristwatch, a pair of smart eyeglasses, and/or the like), a server, or a similar type of device. In some implementations, user device 210 may receive, and output for display, information related to a set of jobs processed by computing nodes 220.

Computing node 220 includes one or more devices capable of receiving, generating, storing, processing, and/or providing information related to a set of jobs scheduled for processing by computing nodes 220. For example, computing node 220 may include one or more personal computers, workstation computers, server devices, or another type of computation and/or communication device. In some implementations, computing node 220 may be a physical device implemented within a housing, such as a chassis. In some implementations, computing node 220 may be a virtual device implemented by one or more computer devices of a cloud computing environment or a data center. In some implementations, computing node 220 may be associated with an application and/or a micro-service. Additionally, or alternatively, computing node 220 may determine a manner in which to assign a set of jobs, related to a micro-service, to one or more computing nodes 220, as described elsewhere herein.

In some implementations, computing node 220 may include a scheduler. For example, as described elsewhere herein, the scheduler may determine a prioritization of a set of computing nodes 220 and/or may assign jobs to the set of computing nodes 220 (e.g., specifying one or more processing constraints associated with the jobs). Additionally, or alternatively, computing node 220 may include a message broker. For example, the message broker may facilitate communications between computing node 220 and one or more other computing nodes 220, as described elsewhere herein. In some implementations, the scheduler and/or the message broker may be separate devices from computing node 220 (e.g., separate physical devices or separate virtual devices).

In some implementations, different computing nodes 220 may be located in different geographic regions (e.g., in different clusters of computing nodes). Additionally, or alternatively, a computing node 220 may correspond to a container, and each container may execute an application instance within a cluster of containers (e.g., a cluster of computing nodes 220). Some techniques described herein assist with scheduling such that only one application instance, out of all of the geographically distributed application instances, processes a particular job and such that a load associated with processing of jobs is distributed among the geographically distributed application instances (e.g., evenly, randomly, and/or the like).

Network 230 includes one or more wired and/or wireless networks. For example, network 230 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
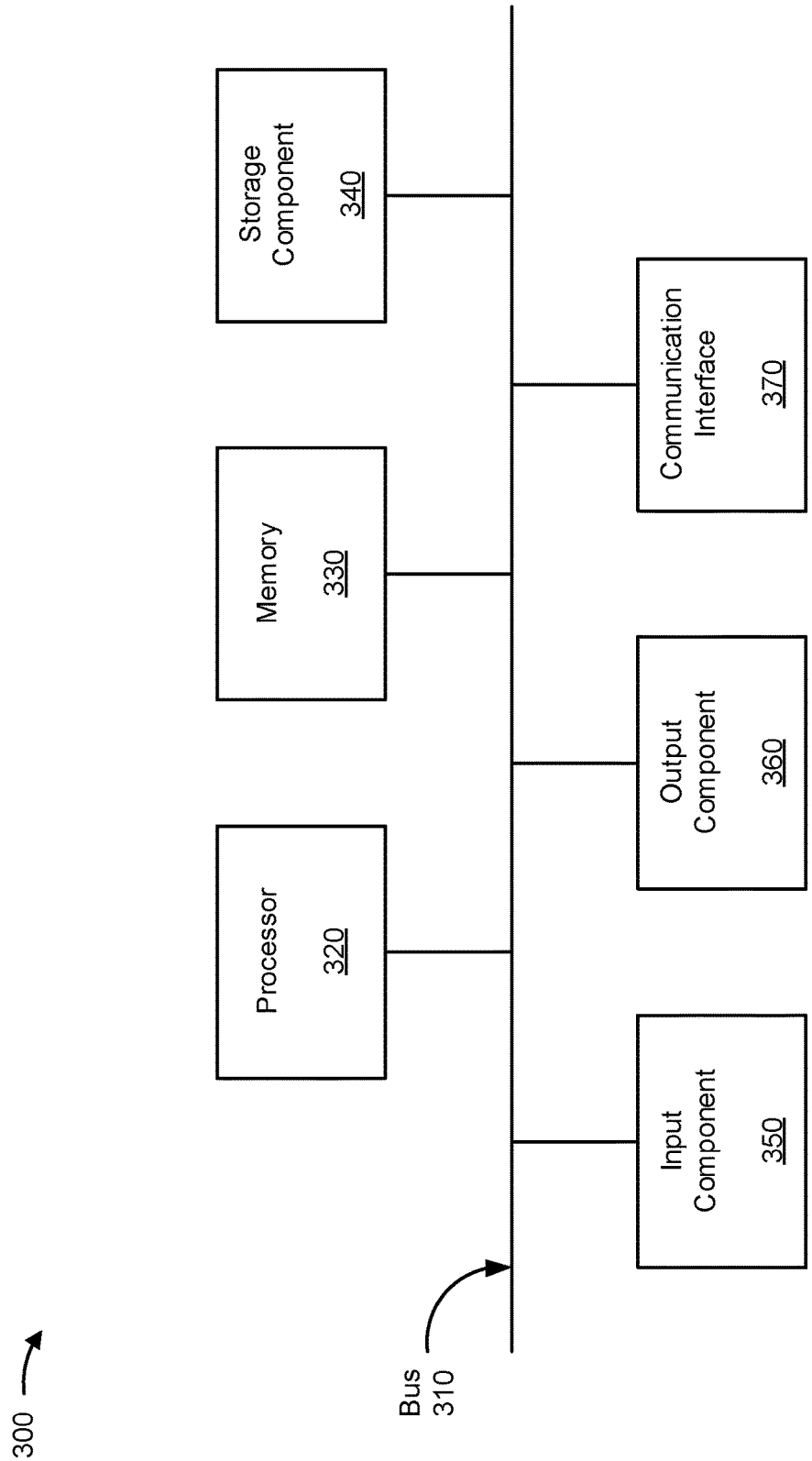
FIG. 3 is a diagram of example components of one or more devices of FIG. 2.

FIG. 3 is a diagram of example components of a device 300. Device 300 may correspond to user device 210 and/or computing node 220. In some implementations, user device 210 and/or computing node 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
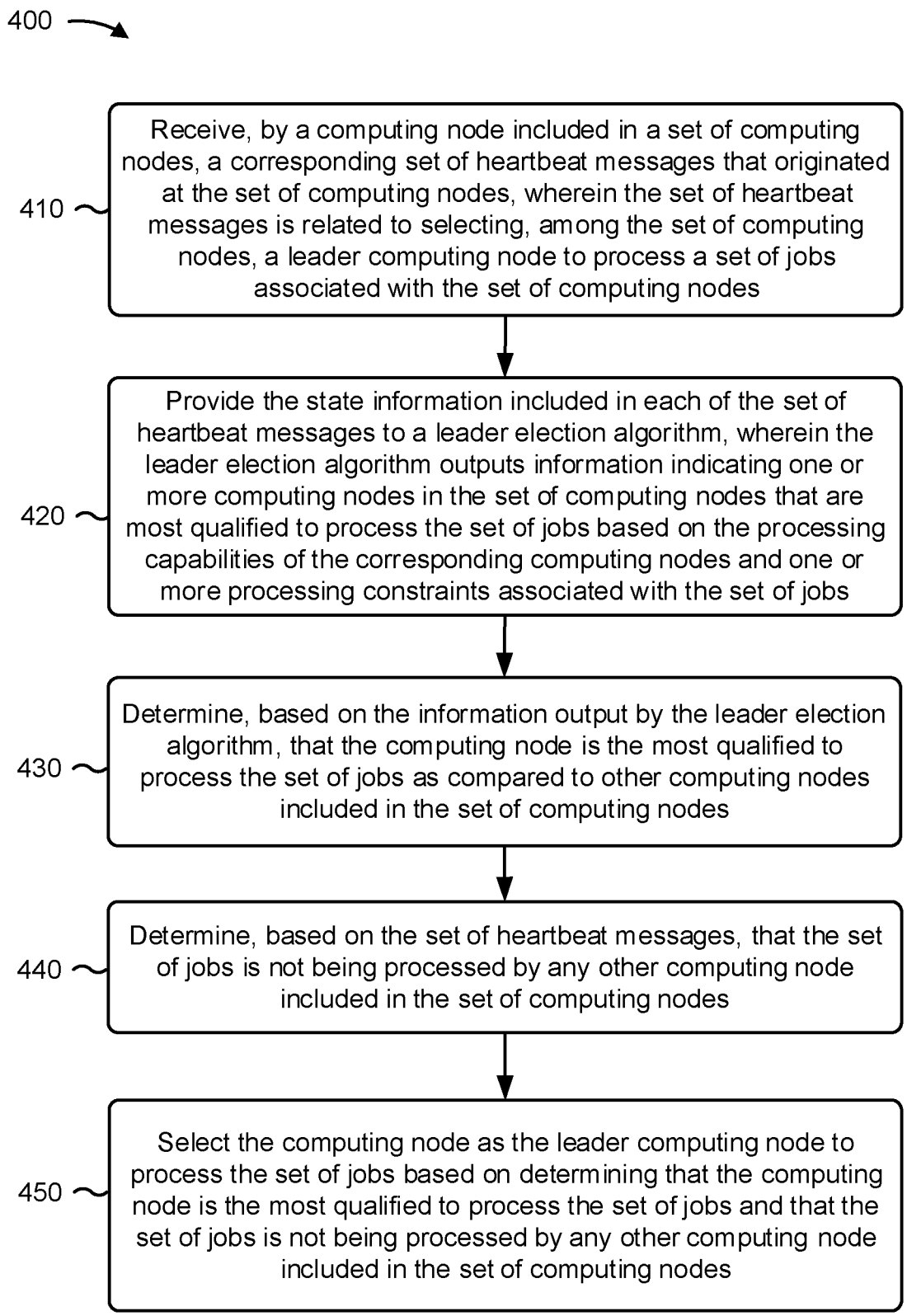
FIGS. 4-6 are flow charts of example processes for computing node job assignment using multiple schedulers.

FIG. 4 is a flow chart of an example process 400 for computing node job assignment using multiple schedulers. In some implementations, one or more process blocks of FIG. 4 may be performed by a computing node (e.g., computing node 220 and/or the like). In some implementations, one or more process blocks of FIG. 4 may be performed by another device or a group of devices separate from or including the computing node, such as user device 210 and/or the like.

As shown in FIG. 4, process 400 may include receiving, by a computing node included in a set of computing nodes, a corresponding set of heartbeat messages that originated at the set of computing nodes, wherein the set of heartbeat messages is related to selecting, among the set of computing nodes, a leader computing node to process a set of jobs associated with the set of computing nodes, and wherein the set of heartbeat messages indicates, for corresponding computing nodes of the set of computing nodes, state information related to processing capabilities of the corresponding computing nodes (block 410). For example, the computing node (e.g., using processor 320, memory 330, storage component 340, input component 350, output component 360, communication interface 370, and/or the like) may receive a corresponding set of heartbeat messages that originated at the set of computing nodes, as described above. In some implementations, the set of heartbeat messages is related to selecting, among the set of computing nodes, a leader computing node to process a set of jobs associated with the set of computing nodes. In some implementations, the set of heartbeat messages indicates, for corresponding computing nodes of the set of computing nodes, state information related to processing capabilities of the corresponding computing nodes.

As further shown in FIG. 4, process 400 may include providing the state information included in each of the set of heartbeat messages to a leader election algorithm, wherein the leader election algorithm outputs information indicating one or more computing nodes in the set of computing nodes that are most qualified to process the set of jobs based on the processing capabilities of the corresponding computing nodes and one or more processing constraints associated with the set of jobs (block 420). For example, the computing node (e.g., using processor 320, memory 330, storage component 340, input component 350, output component 360, communication interface 370, and/or the like) may provide the state information included in each of the set of heartbeat messages to a leader election algorithm, as described above. In some implementations, the leader election algorithm outputs information indicating one or more computing nodes in the set of computing nodes that are most qualified to process the set of jobs based on the processing capabilities of the corresponding computing nodes and one or more processing constraints associated with the set of jobs.

As further shown in FIG. 4, process 400 may include determining, based on the information output by the leader election algorithm, that the computing node is the most qualified to process the set of jobs as compared to other computing nodes included in the set of computing nodes (block 430). For example, the computing node (e.g., using processor 320, memory 330, storage component 340, input component 350, output component 360, communication interface 370, and/or the like) may determine, based on the information output by the leader election algorithm, that the computing node is the most qualified to process the set of jobs as compared to other computing nodes included in the set of computing nodes, as described above.

As further shown in FIG. 4, process 400 may include determining, based on the set of heartbeat messages, that the set of jobs is not being processed by any other computing node included in the set of computing nodes (block 440). For example, the computing node (e.g., using processor 320, memory 330, storage component 340, input component 350, output component 360, communication interface 370, and/or the like) may determine, based on the set of heartbeat messages, that the set of jobs is not being processed by any other computing node included in the set of computing nodes, as described above.

As further shown in FIG. 4, process 400 may include selecting the computing node as the leader computing node to process the set of jobs based on determining that the computing node is the most qualified to process the set of jobs and that the set of jobs is not being processed by any other computing node included in the set of computing nodes (block 450). For example, the computing node (e.g., using processor 320, memory 330, storage component 340, input component 350, output component 360, communication interface 370, and/or the like) may select the computing node as the leader computing node to process the set of jobs based on determining that the computing node is the most qualified to process the set of jobs and that the set of jobs is not being processed by any other computing node included in the set of computing nodes, as described above.

Process 400 may include additional implementations, such as any single implementation or any combination of implementations described below and/or in connection with one or more other processes described elsewhere herein.

In some implementations, the computing node may determine, based on the information output by the leader election algorithm, that the computing node and one or more other computing nodes, included in the set of computing nodes, are tied for being the most qualified to process the set of jobs. In some implementations, the computing node may compute, for each heartbeat message in the set of heartbeat messages, a corresponding hash to break the tie between the computing node and the one or more other computing nodes. In some implementations, the corresponding hash for each respective heartbeat message is computed based on one or more identifiers associated with a corresponding computing node that transmitted the heartbeat message and a time at which the corresponding computing node transmitted the heartbeat message. In some implementations, the computing node is selected as the leader computing node based on the hash associated with the heartbeat message transmitted by the computing node satisfying a condition.

In some implementations, the one or more identifiers used to compute the hash for each heartbeat message include a first universally unique identifier (UUID) associated with the corresponding computing node that transmitted the heartbeat message and a second UUID associated with a scheduler instance executing on the corresponding computing node. In some implementations, the condition is satisfied when the hash associated with the heartbeat message transmitted by the computing node has a smallest value or a largest value as compared to the hashes associated with the heartbeat messages transmitted by the one or more other computing nodes that are tied with the computing node.

In some implementations, the computing node may update the state information related to the processing capabilities of the computing node based on selecting the computing node as the leader computing node and indicate the updated state information in a subsequent heartbeat message transmitted by the computing node.

In some implementations, the computing node may determine whether the set of jobs is in-progress at a time when a subsequent heartbeat message is being generated and indicate, in the subsequent heartbeat message and to the set of computing nodes, an identifier associated with the set of jobs based on determining that the set of jobs is in-progress at the time when the subsequent heartbeat message is being generated.

In some implementations, the computing node may determine, by a scheduler instance executing on the computing node, the set of jobs to be processed based on information contained in one or more data structures shared among the set of computing nodes. In some implementations, the set of jobs includes multiple jobs that are grouped together based on the one or more processing constraints.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
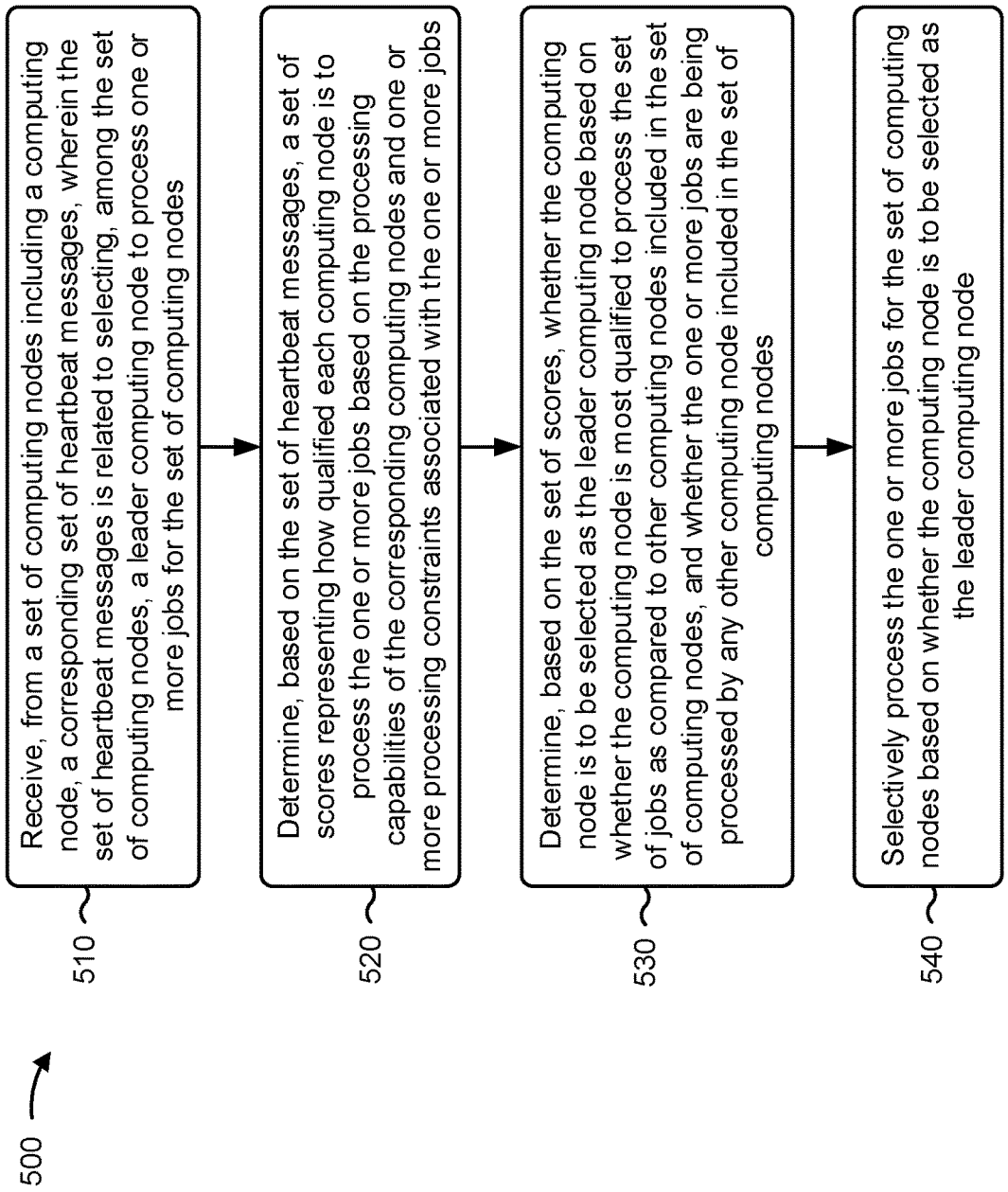

FIG. 5 is a flow chart of an example process 500 for computing node job assignment using multiple schedulers. In some implementations, one or more process blocks of FIG. 5 may be performed by a computing node (e.g., computing node 220 and/or the like). In some implementations, one or more process blocks of FIG. 5 may be performed by another device or a group of devices separate from or including the computing node, such as user device 210 and/or the like.

As shown in FIG. 5, process 500 may include receiving, from a set of computing nodes including the computing node, a corresponding set of heartbeat messages, wherein the set of heartbeat messages is related to selecting, among the set of computing nodes, a leader computing node to process one or more jobs for the set of computing nodes, and wherein the set of heartbeat messages indicates, for corresponding computing nodes of the set of computing nodes, state information related to processing capabilities of the corresponding computing nodes (block 510). For example, the computing node (e.g., using processor 320, memory 330, storage component 340, input component 350, output component 360, communication interface 370, and/or the like) may receive, from a set of computing nodes including the computing node, a corresponding set of heartbeat messages, as described above. In some implementations, the set of heartbeat messages is related to selecting, among the set of computing nodes, a leader computing node to process one or more jobs for the set of computing nodes. In some implementations, the set of heartbeat messages indicates, for corresponding computing nodes of the set of computing nodes, state information related to processing capabilities of the corresponding computing nodes.

As further shown in FIG. 5, process 500 may include determining, based on the set of heartbeat messages, a set of scores representing how qualified each computing node is to process the one or more jobs based on the processing capabilities of the corresponding computing nodes and one or more processing constraints associated with the one or more jobs (block 520). For example, the computing node (e.g., using processor 320, memory 330, storage component 340, input component 350, output component 360, communication interface 370, and/or the like) may determine, based on the set of heartbeat messages, a set of scores representing how qualified each computing node is to process the one or more jobs based on the processing capabilities of the corresponding computing nodes and one or more processing constraints associated with the one or more jobs, as described above.

As further shown in FIG. 5, process 500 may include determining, based on the set of scores, whether the computing node is to be selected as the leader computing node based on whether the computing node is most qualified to process the one or more jobs as compared to other computing nodes included in the set of computing nodes and whether the one or more jobs are being processed by any other computing node included in the set of computing nodes (block 530). For example, the computing node (e.g., using processor 320, memory 330, storage component 340, input component 350, output component 360, communication interface 370, and/or the like) may determine, based on the set of scores, whether the computing node is to be selected as the leader computing node based on whether the computing node is most qualified to process the one or more jobs as compared to other computing nodes included in the set of computing nodes and whether the one or more jobs are being processed by any other computing node included in the set of computing nodes, as described above.

As further shown in FIG. 5, process 500 may include selectively processing the one or more jobs for the set of computing nodes based on whether the computing node is to be selected as the leader computing node (block 540). For example, the computing node (e.g., using processor 320, memory 330, storage component 340, input component 350, output component 360, communication interface 370, and/or the like) may selectively process the one or more jobs for the set of computing nodes based on whether the computing node is to be selected as the leader computing node, as described above.

Process 500 may include additional implementations, such as any single implementation or any combination of implementations described below and/or in connection with one or more other processes described elsewhere herein.

In some implementations, the computing node, when selectively processing the one or more jobs, may process the one or more jobs based on determining that the computing node is most qualified to process the one or more jobs as compared to the other computing nodes and that the one or more jobs are not being processed by any other computing node included in the set of computing nodes, or the computing node may refrain from processing the one or more jobs based on determining that one or more of the other computing nodes are more qualified to process the one or more jobs as compared to the computing node, or the one or more jobs are being processed by another computing node included in the set of computing nodes.

In some implementations, a heartbeat message further indicates, for the computing node, one or more unique identifiers associated with the computing node. In some implementations, the computing node, when determining whether the computing node is to be selected as the leader computing node, may determine, based on the set of scores, that the computing node and one or more other computing nodes, included in the set of computing nodes, are tied for being the most qualified to process the one or more jobs. In some implementations, the computing node may determine, based on the set of heartbeat messages, whether the one or more unique identifiers associated with the computing node satisfy a condition in relation to one or more unique identifiers corresponding to the one or more other computing nodes and determine whether the computing node is to be selected as the leader computing node based on whether the one or more unique identifiers associated with the computing node satisfy the condition.

In some implementations, the computing node, when determining whether the computing node is to be selected as the leader computing node, may generate a sorted list of unique identifiers corresponding to the set of computing nodes. In some implementations, the list is sorted based on the set of scores representing how qualified each computing node is to process the one or more jobs and a hash based on the unique identifiers corresponding to the set of computing nodes in combination with a time at which the set of heartbeat messages were transmitted by the set of computing nodes. In some implementations, the computing node may determine whether the computing node is to be selected as the leader computing node based on the sorted list.

In some implementations, the computing node may store the set of heartbeat messages in the one or more memories after receiving the set of heartbeat messages and expire the set of heartbeat message stored in the one or more memories after determining whether the computing node is to be selected as the leader computing node.

In some implementations, the computing node may determine a status of the one or more jobs at a time when a subsequent heartbeat message is being generated by the computing node, determine a number of times that the computing node has been selected as the leader computing node, and transmit, in the subsequent heartbeat message, updated state information related to the processing capabilities of the computing node. In some implementations, the updated state information includes an indication of the status of the one or more jobs and the number of times that the computing node has been selected as the leader computing node.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
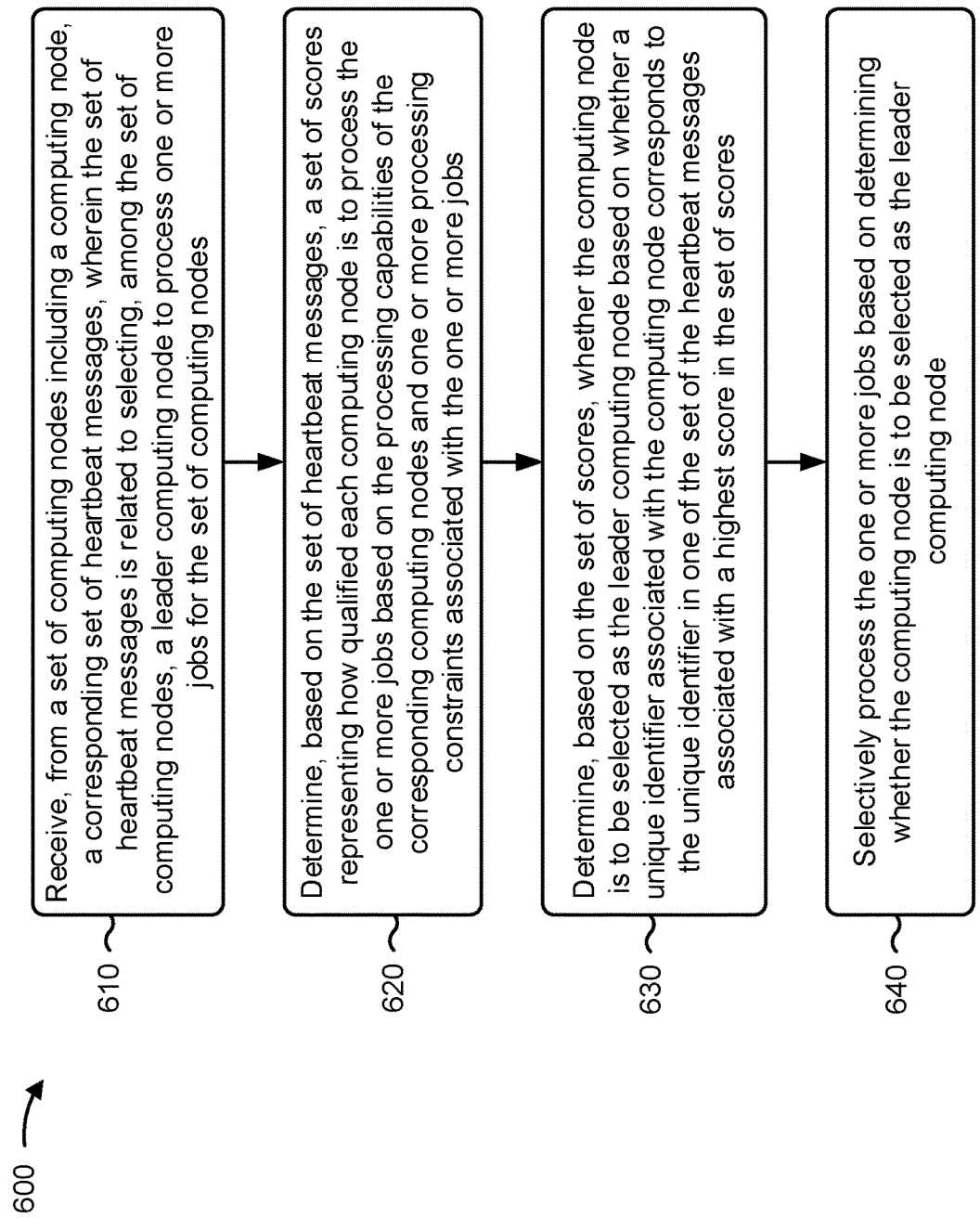

FIG. 6 is a flow chart of an example process 600 for computing node job assignment using multiple schedulers. In some implementations, one or more process blocks of FIG. 6 may be performed by a computing node (e.g., computing node 220 and/or the like). In some implementations, one or more process blocks of FIG. 6 may be performed by another device or a group of devices separate from or including the computing node, such as user device 210 and/or the like.

As shown in FIG. 6, process 600 may include receiving, from a set of computing nodes including the computing node, a corresponding set of heartbeat messages, wherein the set of heartbeat messages is related to selecting, among the set of computing nodes, a leader computing node to process one or more jobs for the set of computing nodes, and wherein the set of heartbeat message indicates, for each corresponding computing node of the set of computing nodes, a unique identifier that distinguishes the corresponding computing node from all other computing nodes included in the set of computing nodes and state information related to processing capabilities of the corresponding computing node (block 610). For example, the computing node (e.g., using processor 320, memory 330, storage component 340, input component 350, output component 360, communication interface 370, and/or the like) may receive, from a set of computing nodes including the computing node, a corresponding set of heartbeat messages, as described above. In some implementations, the set of heartbeat messages is related to selecting, among the set of computing nodes, a leader computing node to process one or more jobs for the set of computing nodes. In some implementations, the set of heartbeat message indicates, for each corresponding computing node of the set of computing nodes, a unique identifier that distinguishes the corresponding computing node from all other computing nodes included in the set of computing nodes and state information related to processing capabilities of the corresponding computing node.

As further shown in FIG. 6, process 600 may include determining, based on the set of heartbeat messages, a set of scores representing how qualified each computing node is to process the one or more jobs based on the processing capabilities of the corresponding computing node and one or more processing constraints associated with the one or more jobs (block 620). For example, the computing node (e.g., using processor 320, memory 330, storage component 340, input component 350, output component 360, communication interface 370, and/or the like) may determine, based on the set of heartbeat messages, a set of scores representing how qualified each computing node is to process the one or more jobs based on the processing capabilities of the corresponding computing node and one or more processing constraints associated with the one or more jobs, as described above.

As further shown in FIG. 6, process 600 may include determining, based on the set of scores, whether the computing node is to be selected as the leader computing node based on whether a unique identifier associated with the computing node corresponds to the unique identifier in one of the set of the heartbeat messages associated with a highest score in the set of scores (block 630). For example, the computing node (e.g., using processor 320, memory 330, storage component 340, input component 350, output component 360, communication interface 370, and/or the like) may determine, based on the set of scores, whether the computing node is to be selected as the leader computing node based on whether a unique identifier associated with the computing node corresponds to the unique identifier in one of the set of the heartbeat messages associated with a highest score in the set of scores, as described above.

As further shown in FIG. 6, process 600 may include selectively processing the one or more jobs based on determining whether the computing node is to be selected as the leader computing node (block 640). For example, the computing node (e.g., using processor 320, memory 330, storage component 340, input component 350, output component 360, communication interface 370, and/or the like) may selectively process the one or more jobs based on determining whether the computing node is to be selected as the leader computing node, as described above.

Process 600 may include additional implementations, such as any single implementation or any combination of implementations described below and/or in connection with one or more other processes described elsewhere herein.

In some implementations, when determining whether the computing node is to be selected as the leader computing node, the computing node may determine that the computing node and one or more other computing nodes, included in the set of computing nodes, are tied for having the highest score in the set of scores and compute, for each heartbeat message in the set of heartbeat messages, a corresponding hash to break the tie between the computing node and the one or more other computing nodes. In some implementations, the corresponding hash for each respective heartbeat message is computed based on the unique identifier included in the respective heartbeat message and a time at which the respective heartbeat message was transmitted. In some implementations, the computing node is selected as the leader computing node based on the hash associated with the heartbeat message transmitted by the computing node satisfying a condition. In some implementations, the condition is satisfied when the hash associated with the heartbeat message transmitted by the computing node has a smallest value or a largest value as compared to the hashes associated with the heartbeat messages transmitted by the one or more other computing nodes that are tied with the computing node.

In some implementations, when determining whether the computing node is to be selected as the leader computing node, the computing node may generate a sorted list of unique identifiers corresponding to the set of computing nodes. In some implementations, the list is sorted based on the set of scores representing how qualified each computing node is to process the one or more jobs and the corresponding hash associated with each respective heartbeat message. In some implementations, the computing node may determine whether the computing node is to be selected as the leader computing node based on the sorted list.

In some implementations, transmissions of the set of heartbeat messages occur according to a periodicity, and the determination of whether the computing node is to be selected as the leader computing node is performed according to the periodicity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a computing node included in a set of computing nodes, a set of heartbeat messages that originated from the set of computing nodes,
   wherein the set of heartbeat messages is related to selecting, among the set of computing nodes, a leader computing node to process one or more jobs associated with the set of computing nodes,
determining, by the computing node and based on the set of heartbeat messages, a set of scores representing how qualified each computing node is to process the one or more jobs based on processing capabilities of corresponding computing nodes, of the set of computing nodes, and one or more processing constraints associated with the one or more jobs;
determining, by the computing node and based on the set of scores, whether the computing node is to be selected as the leader computing node based on whether a unique identifier associated with the computing node corresponds to a unique identifier in one of the set of heartbeat messages, of the set of heartbeat messages, associated with a highest score in the set of scores; and
selectively processing, by the computing node, the one or more jobs based on determining whether the computing node is to be selected as the leader computing node.

2. The method of claim 1, wherein determining whether the computing node is to be selected as the leader computing node comprises:
determining that the computing node and one or more other computing nodes, included in the set of computing nodes, are tied for having the highest score in the set of scores; and
computing, for each heartbeat message in the set of heartbeat messages, a corresponding hash to break the tie between the computing node and the one or more other computing nodes,
   wherein the corresponding hash for each respective heartbeat message is computed based on the unique identifier included in the respective heartbeat message and a time at which the respective heartbeat message was transmitted, and
   wherein the computing node is selected as the leader computing node based on the corresponding hash associated with the heartbeat message transmitted by the computing node satisfying a condition.

3. The method of claim 2, wherein the condition is satisfied when the corresponding hash for each respective heartbeat message transmitted by the computing node has a smallest value or a largest value as compared to hashes associated with heartbeat messages transmitted by the one or more other computing nodes that are tied with the computing node.

4. The method of claim 1, wherein the one or more jobs include multiple jobs that are grouped together based on the one or more processing constraints.

5. The method of claim 1, further comprising:
determining, by a scheduler instance executing on the computing node, the one or more jobs to be processed based on information contained in one or more data structures shared among the set of computing nodes.

6. The method of claim 1, further comprising:
storing the set of heartbeat messages after receiving the set of heartbeat messages; and
expiring the set of heartbeat messages after determining whether the computing node is to be selected as the leader computing node.

7. The method of claim 1, wherein transmissions of the set of heartbeat messages occur according to a periodicity, and wherein the determination of whether the computing node is to be selected as the leader computing node is performed according to the periodicity.

8. A computing node, comprising:
one or more memories; and
one or more processors communicatively coupled to the one or more memories, configured to:
   receive a set of heartbeat messages that originated from a set of computing nodes,
      wherein the set of heartbeat messages is related to selecting, among the set of computing nodes, a leader computing node to process one or more jobs associated with the set of computing nodes,
   determine, based on the set of heartbeat messages, a set of scores representing how qualified each computing node is to process the one or more jobs based on processing capabilities of corresponding computing nodes, of the set of computing nodes, and one or more processing constraints associated with the one or more jobs;
   determine, based on the set of scores, whether the computing node is to be selected as the leader computing node based on:
      whether the computing node is most qualified to process the one or more jobs as compared to other computing nodes included in the set of computing nodes, and
      whether the one or more jobs are being processed by any other computing node included in the set of computing nodes; and
   selectively process the one or more jobs based on determining whether the computing node is to be selected as the leader computing node.

9. The computing node of claim 8, wherein a heartbeat message further indicates, for the computing node, one or more unique identifiers associated with the computing node.

10. The computing node of claim 9, wherein the one or more processors, when determining whether the computing node is to be selected as the leader computing node, are configured to:
generate a list of unique identifiers corresponding to the set of computing nodes,
   wherein the list is sorted based on:
      the set of scores representing how qualified each computing node is to process the one or more jobs, and
      a hash based on the unique identifiers corresponding to the set of computing nodes in combination with a time at which the set of heartbeat messages were transmitted by the set of computing nodes; and
determine whether the computing node is to be selected as the leader computing node based on the list.

11. The computing node of claim 9, wherein transmissions of the set of heartbeat messages occur according to a periodicity, and wherein the one or more processors, when determining whether the computing node is to be selected as the leader computing node, are to:
    determine whether the computing node is to be selected as the leader computing node based on the periodicity.

12. The computing node of claim 8, wherein the one or more processors, when selectively processing the one or more jobs, are configured to:
    process the one or more jobs based on determining that the computing node is most qualified to process the one or more jobs as compared to the other computing nodes and that the one or more jobs are not being processed by any other computing node included in the set of computing nodes, or
    refrain from processing the one or more jobs based on determining that:
        one or more of the other computing nodes are more qualified to process the one or more jobs as compared to the computing node, or
        the one or more jobs are being processed by another computing node included in the set of computing nodes.

13. The computing node of claim 8, wherein the one or more processors are further configured to:
    store the set of heartbeat messages after receiving the set of heartbeat messages; and
    expire the set of heartbeat messages after determining whether the computing node is to be selected as the leader computing node.

14. The computing node of claim 8, wherein the set of computing nodes are subscribed to a message stream of a message broker; and
    wherein the one or more processors, when receiving the set of heartbeat messages, are to:
        receive the set of heartbeat messages based on being subscribed to the message stream.

15. A non-transitory computer-readable medium storing instructions, the instructions comprising:
    one or more instructions that, when executed by one or more processors of a computing node, cause the one or more processors to:
        receive a set of heartbeat messages that originated from a set of computing nodes,
            wherein the set of heartbeat messages is related to selecting, among the set of computing nodes, a leader computing node to process one or more jobs associated with the set of computing nodes;
        determine, based on the set of heartbeat messages, a set of scores representing how qualified each computing node is to process the one or more jobs based on processing capabilities of corresponding computing nodes, of the set of computing nodes;
        determine, based on the set of scores, whether the computing node, of the set of computing nodes, is to be selected as the leader computing node based on the computing node being associated with a highest score in the set of scores; and
        selectively process the one or more jobs based on determining whether the computing node is to be selected as the leader computing node.

16. The non-transitory computer-readable medium of claim 15, wherein the set of heartbeat messages includes information that identifies information associated with a computing node from which a heartbeat message, of the set of heartbeat messages, originated.

17. The non-transitory computer-readable medium of claim 16, wherein the set of scores are based on one or more of:
    a quantity of jobs of the corresponding computing nodes,
    processing capabilities of the corresponding computing nodes,
    throughput of the corresponding computing nodes,
    an anticipated work load of the corresponding computing nodes,
    a historical job load of the corresponding computing nodes,
    geographic locations of the corresponding computing nodes,
    an age of the corresponding computing nodes,
    configurations of the corresponding computing nodes,
    scheduled downtime for the corresponding computing nodes,
    historical failures of the corresponding computing nodes,
    predicted failures of the corresponding computing nodes,
    dependencies among jobs and/or sets of jobs, or
    timing constraints or performance constraints for certain jobs.

18. The non-transitory computer-readable medium of claim 15, wherein the one or more jobs includes multiple jobs that are grouped together based on one or more processing constraints.

19. The non-transitory computer-readable medium of claim 15, wherein the one or more instructions, when executed by the one or more processors, further cause the one or more processors to:
    store the set of heartbeat messages after receiving the set of heartbeat messages; and
    expire the set of heartbeat messages after determining whether the computing node is to be selected as the leader computing node.

20. The non-transitory computer-readable medium of claim 15, wherein transmissions of the set of heartbeat messages occur according to a periodicity, and
    wherein the determination of whether the computing node is to be selected as the leader computing node is performed according to the periodicity.

* * * * *